United States Patent [19]

Craig

[11] 4,286,370
[45] Sep. 1, 1981

[54] UNIVERSAL JOINT FLEXURE HINGE SUSPENSION SYSTEM, AND METHOD FOR MANUFACTURING THIS SYSTEM

[75] Inventor: Robert J. G. Craig, Malibu, Calif.

[73] Assignee: Incosym, Inc., Westlake Village, Calif.

[21] Appl. No.: 150,742

[22] Filed: May 19, 1980

Related U.S. Application Data

[63] Continuation of Ser. No. 822,384, Aug. 5, 1977, abandoned.

[51] Int. Cl.³ .................... B23P 1/00; G01C 19/18
[52] U.S. Cl. ............................. 29/434; 29/558; 74/5 F; 308/2 A
[58] Field of Search .............. 29/434, 416, 558, 445; 74/5 F; 308/2 A; 64/15 B, 27 B

[56] References Cited

U.S. PATENT DOCUMENTS

| | | | |
|---|---|---|---|
| 2,611,659 | 9/1952 | Hadley | 308/2 A |
| 2,793,028 | 5/1957 | Wheeler | 74/5 F |
| 2,931,092 | 4/1960 | Humphrey | 308/2 A |
| 2,937,053 | 5/1960 | Rigney | 308/2 A |
| 2,947,067 | 8/1960 | Vice et al. | 308/2 A |
| 2,960,302 | 11/1960 | Brown | 248/358 |
| 3,063,670 | 11/1962 | Young | 74/5 F |
| 3,290,949 | 12/1966 | Samet | 74/5 F |
| 3,362,701 | 1/1968 | Kistler | 267/160 |
| 3,413,858 | 12/1968 | Samet | 74/5 F |
| 3,427,828 | 2/1969 | Stiles | 64/15 B |
| 3,430,276 | 3/1969 | Ashley et al. | 74/5 F |
| 3,463,016 | 8/1969 | Erdley et al. | 74/5 A |
| 3,512,419 | 5/1970 | Stiles | 74/5 F |
| 3,527,062 | 9/1970 | Bilinski et al. | 64/15 B |
| 3,543,301 | 11/1970 | Barnett | 74/5 F |
| 3,575,475 | 4/1971 | Boerner | 308/2 A |
| 3,585,866 | 6/1971 | Ensinger | 74/5 F |
| 3,614,894 | 10/1971 | Ensinger | 74/5 F |
| 3,702,568 | 11/1972 | Howe | 74/5 F |
| 3,709,045 | 1/1973 | Krupick et al. | 74/5 F |
| 3,811,172 | 5/1974 | Bilinski et al. | 29/445 |
| 3,832,906 | 9/1974 | Craig | 74/5 F |
| 3,856,366 | 12/1974 | Weisbord et al. | 308/2 A |
| 3,943,778 | 3/1976 | Wyse | 74/5 F |
| 3,957,316 | 5/1976 | Armitage | 308/2 A |
| 3,974,701 | 8/1976 | Erdley | 74/5 F X |
| 4,003,265 | 1/1977 | Craig et al. | 74/5 R |
| 4,114,402 | 9/1978 | Craig et al. | 64/15 B |
| 4,143,451 | 3/1979 | Craig et al. | 29/434 |

OTHER PUBLICATIONS

"Theory of Operation of an Elastically Supported, Tuned Gyroscope", Craig, *IEEE Transactions on Aerospace and Electronic Systems*, vol. AES-8, No. 3, (May 1972).

"Theory of Errors of a Multigimbal, Elastically Supported, Tuned Gyroscope", Craig, *IEEE Transactions on Aerospace and Elect. Sys.*, vol. AES-8, No. 3, (May 1972).

"Dynamically Tuned Gyros and Strapdown Systems", Craig, Conf. Proceedings, No. 116, Inertial Navigation Comp. & Sys., Advisory Group for Aerospace Research and Development of NATO.

*Primary Examiner*—Rodney H. Bonck
*Attorney, Agent, or Firm*—Marvin H. Kleinberg

[57] ABSTRACT

A monolithic two axis gimbal suspension system for a tuned inertial instrument includes flexure hinges which are formed monolithically integral therein to define the pivot axis of the suspension system, each monolithically integral flexure hinge having aligned pairs of skew, crossed bridges integral with the relatively rotatable gimbals of the suspension system. The suspension system is used in a dry tuned gyroscope to suspend the gyro rotor from the gyro spin shaft. A method for making the monolithic suspension system comprises electro discharge machining of a monolithic workpiece mounted on a movable mandrel. Monolithically integral flexure hinges comprising skew, crossed bridges formed therein, interconnect gimbal portions which are formed in the workpiece. Construction of an improved tuned gyroscope employing the monolithic suspension system in a single compartment housing is described.

12 Claims, 20 Drawing Figures

UNIVERSAL JOINT FLEXURE HINGE SUSPENSION SYSTEM, AND METHOD FOR MANUFACTURING THIS SYSTEM

This is a continuation, of application Ser. No. 822,384, filed Aug. 5, 1977, now abandoned.

BACKGROUND OF THE INVENTION

1. Field of Invention:

The present invention relates to suspension systems for gyroscopes and other precision inertially sensitive instruments. More particularly, the present invention relates to monolithically integral suspension systems having monolithically integral flexure hinges therein, and inertial instruments utilizing such suspension systems.

2. Prior Art:

In the prior art dry tuned gyroscopes have been constructed and utilized in which the rotor of the gyroscope is attached to the spin shaft of the gyroscope through a two axis or a two degree of freedom suspension system which allows the rotor enough freedom of movement relative to the shaft to which it is attached so that the rotor in response to a disturbing rotation can maintain an independent orientation in space with respect to the shaft as the rotor rotates with the shaft. Restoring torques for deflections of the rotor relative to the shaft which are provided by centrifugal force are opposed by flexible elements in the suspension and are thus cancelled against each other (in the tuned condition) to leave the rotor substantially unconstrained for small deflectional rotation with respect to the shaft. The tuned frequency of the rotor is determined in part by the appropriae moments of inertia of the gimbal structure and by the elastic forces involved in the operation of the suspension. Conventionally such a gyroscope can be used in strapped-down (or flat form) application. In strapped-down applications electro-magnetic torquers are provided in the gyroscope to applying torquing forces which null the deflections of the rotor in response to applied rotations, the currents in the torquers then becoming a measure of the direction and magnitude of the rotations which are being sensed by the gyroscope.

The dry, tuned gyroscope because of its many advantages over the prior art floated instruments has rapidly begun to dominate the field of gyroscopic instruments. The theory of operation of elastically supported, dry tuned gyroscopes is well presented in the paper by the present inventor Craig entitled "Theory of Operation of an Elastically Supported, Tuned Gyroscope", *I.E.E.E. Transactions on Aerospace and Electronic Systems* (May, 1972) Vol. AES-8 No. 3, at page 280. In that paper's discussion of the elastically supported, tuned gyroscope, the two axis or two degree of freedom suspension system which connects the rotor of the gyroscope to the rotating shaft is shown as a gimbal system connected by one pair of torsion rods to the rotor (to define one axis of rotation of the rotor) and connected by another pair of torsion rods to the shaft (to define a second axis of rotation of the rotor relative to the shaft). A similar torsion spring gimballed gyro is shown schematically in FIG. 1 of Erdley et al., U.S. Pat. No. 3,463,016, and a related device is shown in U.S. Pat. No. 3,974,701, also to Erdley.

In the development of the inertial art two axis elastic suspension systems utilizing torsion rods as the flexible elements are being rapidly replaced by two axis elastic suspension systems which utilize flexure hinges or pivots as the flexible elements. Such flexure hinges are ordinarily constructed as a pair of crossed, metal straps which are connected between two elements which are to be rotatable with respect to each other. Each strap acts as a bridge between the two elements which are to be rotatable with respect to each other and the geometry of the crossed straps is such that they establish a precise pivot axis at the line of intersection of the crossed straps or bridges. The accuracy and utility of an elastic suspension system utilizing flexure pivots is in the prior art determined by the accuracy of construction of the flexure pivots themselves and by the accuracy of assembly of the total suspension structure comprising gimbals and flexure pivots assembled together by such methods as cementing, bonding, etc. To the extent that such an elastic suspension system comprises many different parts which have to be assembled together there is a loss of accuracy due to accumulation of machining tolerances, errors in assembly and the loss of stability of the structure implicit in having cemented connections or other types of bonding of the separate parts. In the prior art several attempts have been made to improve the design and construction of such suspension systems but none has been totally effective. For example, U.S. Pat. No. 3,832,906 by the present inventor Craig shows an elastic suspension system constructed using a plurality of one-piece flexure pivots or hinges and a plurality of gimbal members all of which are cemented or bonded together in a particular configuration to create a two axis elastic suspension for the rotor of a tuned gyroscope. However, because of the large number of parts that have to be assembled, this design is subject to accumulation of machining tolerances and to instability in the bonding materials used wich severely limits its ultimate utility and effectiveness.

U.S. Pat. No. 3,811,172 to Bilinski shows another method of attempting to solve this problem of stability and accuracy of an elastic suspension system in which Bilinski has his gimbals formed by two cylinders which are nested within one another and are bonded together. Before the cylinders are nested together and bonded they are each separately cut by a forming tool so that for each flexure hinge which is to ultimately exist in the suspension ststem, one strap or bridge of the flexure hinge is formed in one of the cylinders and the corresponding crossed-strap of the flexure hinge is formed in the other of the cylinders. When the two cylinders are positioned properly, nested within each other and bonded, the cooperation of the separated straps or hinges in the two separated cylinders is such that they simulate or emulate the performance of a conventional flexure hinge. This structure of Bilinski reduces the entire elastic suspension system to two elements which are bonded together. However, the performance of the system is critically dependent upon the accurate cutting of the two separate cylinders, upon their thoroughly accurate positioning relative to one another, and upon the long term stability of the cementing or bonding compound which is utilized. In proactice, these requirements severely limit the ultimate performance of an elastic suspension system constructed in accordance with the teachings of Bilinski. Moreover, in the Bilinski device because the pivot axis is established by separate bridge elements in two separate cylindrical structures the flexure hinges formed are not true flexure hinges but only emulations thereof and have a certain lack of definition or region of uncertainty of the defined pivot axis which also limits the performance of such a device.

The Bilinski structure also has a subtle limitation as to its ability to withstand large axial accelerations or G-loadings, as might be encountered in many applications of a gyroscopic instrument. Because of the structure of the Bilinski device in response to an applied axial acceleration or force only half of the bridge elements of the flexures will bear the tensional or compressional forces, and thus only half of the bridges carry the stresses. This severely limits the load bearing utility of the suspension system in many gyroscopic applications.

There also exists another structure similar to Bilinski which, however, has its multi-part flexures oriented so as to have a very symmetrical response to G-loadings or accelerations in either direction along the spin axis. Because the response of this suspension system is symmetrical with respect to G-loadings, the frequency response of this gimbal system will be the same independent of the orientation with respect to gravity of a gyroscope employing such a suspension system. Thus, with this structure, when two gyroscopes are used in a strapped-down or platform inertial navigation system in which the gyroscopes are at different orientations with respect to gravity, they will nevertheless both have the same tuned frequency. However, because of cross coupling effects between the two gyroscopes in practice, it is customary to actually operate both of the gyroscopes detuned in opposite direction either by physically detuning the suspensions or by driving them with two different spin frequencies which slightly detunes both gyros. This reduces cross coupling between the gyroscopes. However, as a result either the gyroscopes are no longer uniform causing great problems in maintenance of stock gyroscopes, replacement of gyroscopes, etc., or the gyroscopes are operated detuned reducing their performance and sensitivity.

The ultimate performance of a gyroscope is also intimately connected with the nature of the mechanical, thermal, and gaseous environment in which it operates, as established by the construction of the support structures and housing of the gyroscope. Ordinarily in the prior art the main support structure for a gyroscope is established by a web in a central cylindrical section of a cylindrical housing, with the gyro motor usually below this web and the gyro rotor usually above the central web, the housing being completed by positioning top and bottom housing caps which are sealed and bonded against the central cylindrical housing member to provide a vacuum-tight enclosure. The use of two seals multiplies leakage problems in attempting to maintain the reduced pressure, hydrogen atmosphere which is commonly used in the interior of dry tuned gyroscopes. In turn, windage, thermal gradient and environmental stability of materials over long periods of time are critically affected. Moreover, the structures of the described type tend to fairly well act like a volume having two separated top and bottom compartments with much increased opportunity for varying thermal and dimensional effects taking place in the separated compartments so as to limit the stability and uniformity of the total structure. With respect to prior art, complete gyro structures, representative examples of such structures can be seen in U.S. Pat. No. 3,354,726 to Krupick, et al. and U.S. Pat. No. 3,463,016 and No. 3,676,764, both to Erdley. et al. It should be noted that in such a system any tests of spin bearings or of other elements of the spin assembly can only be conducted after the spin assembly is loaded into the overall gyro structure (because the spin assembly is not completed until that time). This creates severe operational problems in routine testing and maintenance of gyroscopes.

SUMMARY

In brief, in accordance with one aspect of the present invention, a monolithic flexure hinged gimbal suspension system is provided to support an inertially sensitive element. The monolithic flexure hinge comprises a first, second and third generally cylindrical portions aligned along a common axis, and slightly spaced from each other. The gimbal portions are connected to each by a pair of flexure hinges arranged diametrically oppposite each other between the respective portions being connected. The diameter defined by one pair of flexure hinges is orthogonal to a diameter defined by a second pair of flexure hinges connecting another portion.

One of the portions constituting the flexure hinged suspension system is adapted to be fixed or onnected to the spinning shaft of a gyroscope. Another portion is adapted to be connected to the rotor or inertially sensitive element of a gyroscope. The pairs of flexure hinges connecting the portions provide two degrees of freedom for the rotor connected portion relative to the shaft connected portion.

The monolithic flexure hinge suspension system is made from a single solid workpiece using electro-discharge machining (EDM) techniques. The workpiece, having a cylindrically vacated center, is precisely manipulated on a movable mandrel. A novelly designed EDM cutter is used to form integral crossed, skew bridges directly in the metal of the single monolithic workpiece. Different EDM cutter designs are used to form cuts in the single workpiece in other locations to complete the definition of the monolithic suspension system. Because all elements of the suspension system are formed in a single monolithic workpiece, new levels of accuracy and stability can be readily obtained in the resultant monolithic suspension system.

In one aspect of the invention, the suspension system passes applied stress in an identical type or form (either tension or compression) through all integral bridges. In another aspect of the invention, the integral bridges are formed in pairs in such a manner that one of the bridges of the pair will sustain stress in an opposite form from that of its adjacent, paired bridge.

From the descriptions given thus far, it may be appreciated that the suspension system of the present invention can be useful for connecting any two elements, where the limited angular movement of one element relative to the other is desired to be detected. Technological applications can be found in accelerometers, gyroscopes and other similarly used instruments.

In one particular aspect of the invention, the suspension system can be assembled in a unitary gyroscope instrument comprising a spinnable shaft, a shaft spin drive means, an inertially sensitive rotor, torquers for restoring the rotor relative to the spin axis of the shaft, and rotor and torquer shielding means. The unitary construction greatly simplifies procedures of gyroscope assembly, housing manufacture and component repair. The unique assembly afforded by the suspension system, further, provides for a very substantial increase in tensile strength of the suspension system, and of the acceleration pressures sustainable by the gyroscope.

The method of manufacturing the suspension system and of the unitary gyroscope assembly, in yet another aspect of the present invention, affords greatly improved quality control over the symmetry of the suspension system and of the gyroscope assembly. Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

DESCRIPTION OF THE PREFERRED EMBODIMENT

Figure 1:
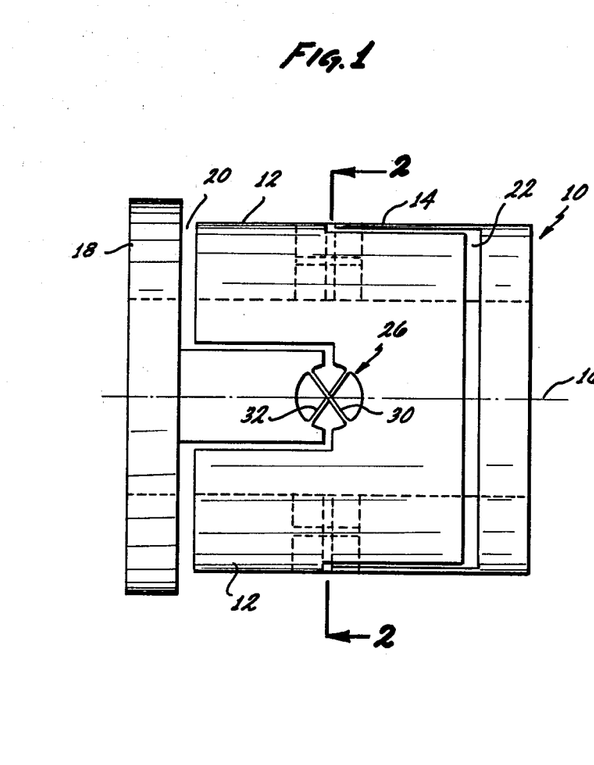
FIG. 1 is a side elevation of a monolithic flexure hinge suspension system in completed form in accordance with one embodiment of the invention.
Figure 2:
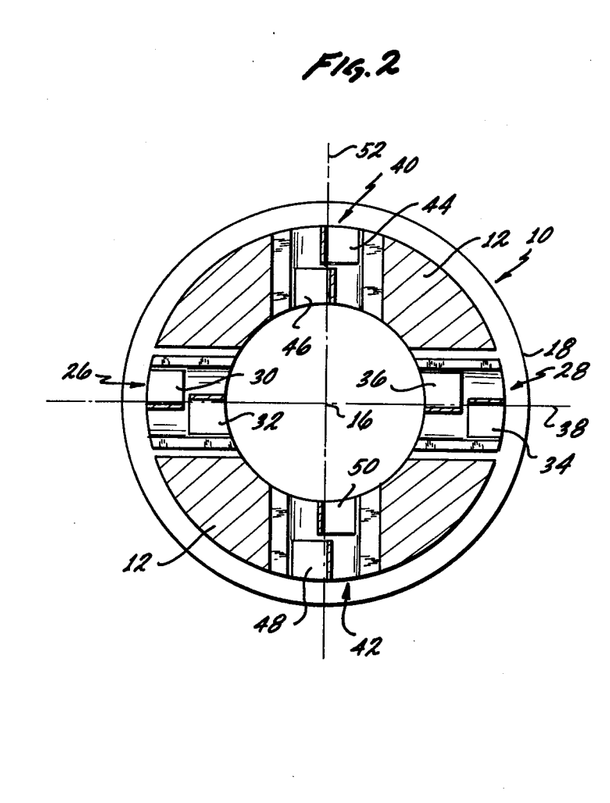
FIG. 2 is a cross-section view of the suspension system of FIG. 1 as seen along line 2—2 in the direction of the arrows.

FIGS. 1 and 2 show a monolithic flexure hinge suspension system suitable for gyroscopes and accelerometers in accordance with the present invention. In the immediately following discussion, assistance may be had by viewing FIG. 9, a perspective view showing the completed invention in elevation, as well as the cross-section views of FIGS. 1 and 2. A common numbering scheme will be used throughout for aid in understanding the invention.

Figures 7, 8, 8A, 9:
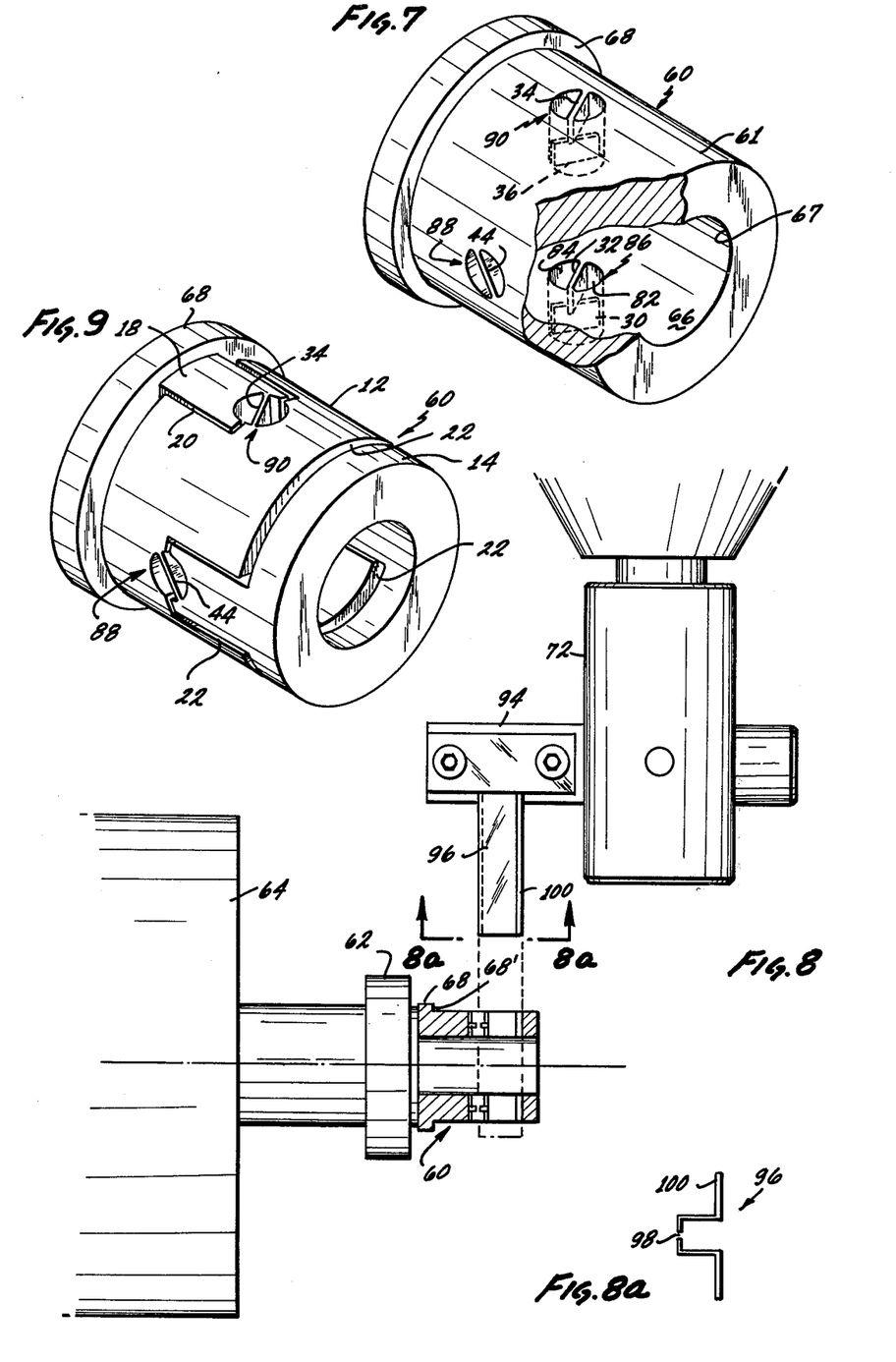
FIG. 7 is a perspective view of the workpiece of FIG. 6 after completion of certain steps of manufacture, having certain portions of the workpiece in perspective cut away for clarity and perception.
FIG. 8 is a side elevation, again showing the workpiece in cross-section, of machinery and procedures in the manufacturing process of the present invention.
FIG. 8a is a cross-section view of the EDM cutter shown in FIG. 8, taken along line 8a—8a in the direction of the arrows.
FIG. 9 is a perspective view of the flexure hinge of FIGS. 1 and 2.

A monolithic flexure hinge suspension 10 is shown having three distinguishable portions. A gimbal portion 12 is substantially cylindrical in shape, and spaced from a shaft connection portion 14, also cylindrical in shape. Portion 14 is spaced from portion 12, and aligned along a common axis 16. While the portions are described herein as cylindrical or like a ring, it should be understood that substantially ring-like, or closed annular shapes may, in fact, prove useful.

A rotor connecting portion 18 is also substantially cylindrical in shape. Rotor connecting portion 18 is aligned along axis 16 and spaced from portion 12. Portion 18 is separated from portion 12 by an irregular cut 20 passing completely through the suspension 10. Portion 12 is similarly separated from portion 14 by an irregular cut 22, also passing completely through the suspension 10.

Portion 18 is integrally connected with portion 12 by flexures 26 and 28 disposed diametrically opposite each other. Flexure 26 comprises a first bridge 30 and a second bridge 32. Both bridges 30, 32 consist of a thin, blade-shaped portion of material integrally connecting portion 12 and portion 18. Bridge 30 is positioned in skew relation with bridge 32 within the cylindrical opening through the cylindrical walls of the portions 12 and 18 in which the bridges 30, 32 are positioned.

Bridges 34 and 36 are positioned within the same geometric cylinder encompassing the bridges 30, 32 but on the opposite side of the axis 16. The bridges 34 and 36 are integral with the connected portions 12 and 18 and are skew in relation to each other. It should be noted that there is a discrete gap between the proximate bridges 34 and 36, as well as between the proximate bridges 30 and 32.

Similarly, a pair of flexures 40 and 42 integrally connect portion 12 with shaft-connecting portion 14. Flexures 40 and 42 are encompassed by a common cylinder, and are positioned in diametrically opposite sides of the substantially cyclindrical portions 12 and 14. Flexure 40 comprises two skew bridges 44 and 46 intergral with the connected portions 12 and 14.

Flexure 42 comprises two skew bridges 48 and 50 similarly integral with the conected portions 12 and 14. These bridges, as well as the bridges in the afore-mentioned flexures, are considered skew in that they do not touch each other. Each has a distinct gap between it and the adjacent bridge within its respective opening through the cylindrical walls of the portions.

Since the principles of rotational pivoting about the intersection of crossed straps are well known in the specific art of gyroscope engineering and design, these principles need not be described here for conveying an understanding of the invention, and no further detailed description nor illustration is believed necessary. U.S Pat. No. 3,832,906 to the inventor of the present invention, which discloses, for example in FIG. 7, crossed blade X-flexures, and of U.S. Pat. No. 3,413,858 to Samet, as well as other patents cited in the background of the present specification show flexure pivots and hinge assemblies utilizing the criss-crossed blade pivoting concept.

As will be appreciated by those skilled in the art from the foregoing description, portion 14 is now able to rotate about axis 52 relative to the gimbal portion 12. Similarly, rotor connecting portion 18 can rotate about axis 38 relative to the gimbal portion 12.

In FIGS. 3, 4, 5, 6, 7, 8, 8a, 9, 10, 10a and 11, a method for manufacturing the unique monolithic flexure hinge suspension of FIGS. 1 and 2 is illustrated. In the manufacture or formation of the flexure hinge suspension, a workpiece 60 is mounted to a rotatable mandrel 62, which in turn is mounted to a movable block 64.

Figure 3:
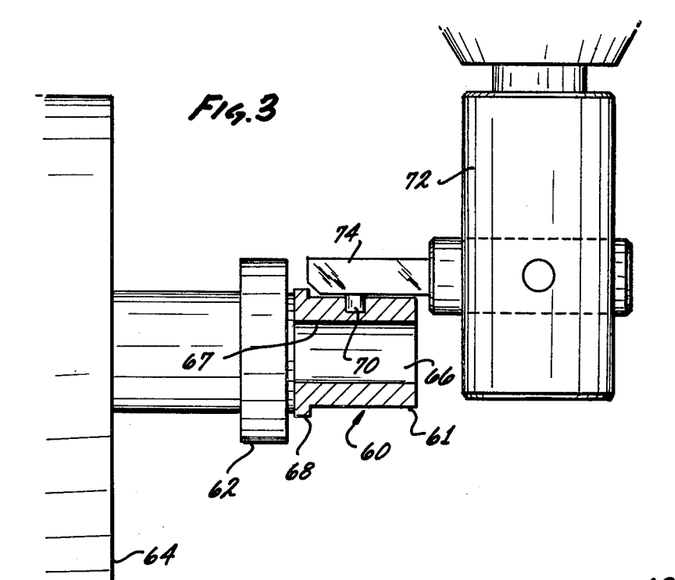
FIG. 3 is a side elevation showing a workpiece in cross section, in one step in the method of making the flexure hinge of FIG. 1 using electro-discharge machining techniques.

The workpiece 60, shown in cross-section in FIG. 3, may have a central portion 66 vacated, bored or otherwise formed prior to mounting on the mandrel 62. If desired, however, boring or other machining of the cylindrical interior 66 may be performed as the first step. The workpiece 60 is substantially, therefore, cylindrical in form having an annular flare or flange 68 at one end. The cylindrical workpiece 60 has an outside surface 61 and an interior surface 67.

A movable cutting tool 70 is mounted on a vertically movable machine element 72. The cutter 70 is held to the element 72 by a holder 74 which is capable of, along with the cutter 70, being inserted within the cylindrical interior 66, the operation therein being described in greater detail below.

The cutter 70 is brought vertically into contact with the outside of the cylindrical wall of workpiece 60. The cutter 70 comprises an electro-discharge machining cutter having the spaced semi-cylindrical tips form detailed in FIG. 5. Thus, by the development of a voltage potential at the two tips 73a and 73b, two semi-cylindrical depressions or holes are formed from the exterior or outside surface of the cylindrical workpiece 60, as shown in perspective in FIG. 4. EDM tip 73a forms the hole 76, and EDM tip 73b forms hole 78. Both holes 76 and 78 are spaced apart from each other to fit within a common cylinder, and to leave a bridge 30 diametrically thereacross.

Figure 5:
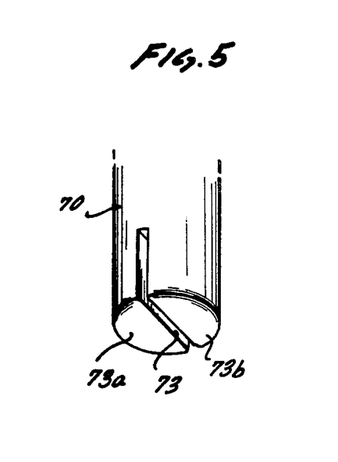
FIG. 5 is a perspective view of an electro-discharge machining cutter utilized in the methods of the present invention.
Figure 6:
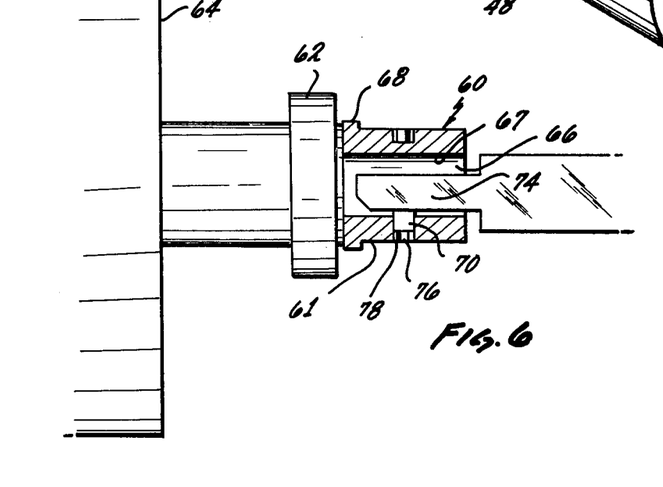
FIG. 6 is a side elevation, showing the workpiece in cross-section, of machinery for employing additional steps in the manufacture of the flexure hinge of FIG. 1.

Other shapes for the EDM spaced tips may be used. For example, a pair of spaced triangularly shaped, complemental tips may be used with satisfactory results. Other EDM tips will provide the resulting desired bridge.

The holes 76, 78 are formed or cut to a depth slightly more than one-half the thickness of the cylindrical wall of workpiece 60. The cutter 70 is then vertically removed from the so-formed holes or depressions, and the mandrel 62 is rotated precisely one-quarter of a turn three times in succession. After each quarter turn, the cutter 70 forms similar holes or depressions partially through the cylindrical wall from the outside surface of the workpiece 60.

The method encompassed by the present description is directed to the formation of a three portion hinge gimbal having two degrees of freedom. It should be readily appreciated from this description that a two portion gimbal having only one degree of freedom may be formed using the same method, but omitting the formation of half of the described depressions and flexures, and by omitting half of the separation cuts that will be described below. For example, to form two flexures oppositely disposed relative to the cylinder axis, the workpiece may be rotated only twice, a half-turn each time.

Figure 4:
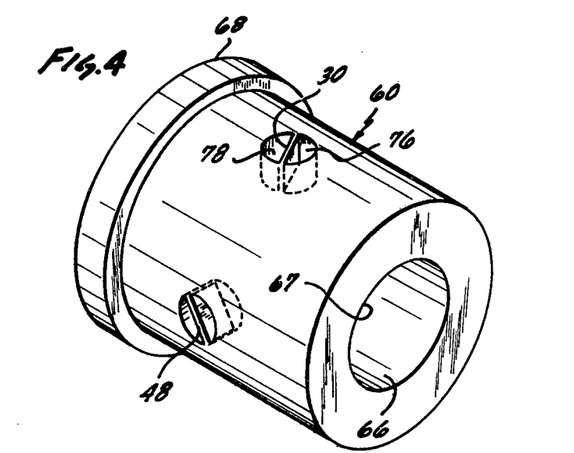
FIG. 4 is a perspective view of the workpiece after completion of steps of the method for making the flexure hinge suspension system of FIG. 1.

At the end of this hole-forming step, the workpiece 60 will have the general appearance as seen in FIG. 4. The workpiece 60, it may be appreciated, may remain connected to the mandrel 62 for the next step illustrated in FIGS. 6 and 7. The movable machine element 72 is manuevered so as to insert the cutter holder 74 within the cylindrical interior 66, as seen in elevation in FIG. 6.

The cutter 70 is then vertically brought into contact with the workpiece 60 at its interior surface 67. The cutter 70 then, again preferably by electro-discharge machine techniques, forms two semi-cylindrical holes or depressions 82 and 84, seen in FIG. 7.

The holes 82 and 84 are formed within the coincidental cylinder encompassing holes 76 and 78 formed from the outside surface 61 as described above. The cutter forms the depressions slightly more than half-way through the thickness of the cylindrical wall of the workpiece 60. Thus, in forming the holes from the interior surface 67, the cutter removes part of the bridge 30 left remaining after the formation of the holes 76 and 78.

The formation of the holes 82 and 84 leave the bridge 32 diametrically across the encompassing cylinder. The bridge 32, it is noted, criss-crosses bridge 30 and is skew relative thereto. This relationship of the bridge 30 to bridge 32 is formed without manuevering or adjusting the orientation of cutter 70. The gap 73 in the cutting end of cutter 70 has an alignment which is substantially at variance with the longitudinal diameter of the workpiece 60.

The cutter holder 70 is then elevated in a vertical direction to remove the cutter 70 from the newly formed holes 82, 84. The workpiece 60 is then rotated 90 degrees three times to form additional holes 82, 84 coaxially with, and totally encompassed by the encompassing cylinders encompassing the diametrically opposite flexure hinges 28, 40 and 42. The cutter 70 and cutter holder 74 are then removed from the interior 66.

There remains openings 86, 88 and 90, as well as a fourth opening not seen in FIG. 7 of the drawings, each of which openings penetrates all the way through the cylindrical wall of workpiece 60. Each of the openings 82, 88, 90 are bifurcated two separate ways by the corresponding bridges 30, 32, in opening 84, bridges 44, 46 in opening 88, bridges 34 and 36 in opening 90, and bridges 48 and 50 and the opening not seen in FIG. 7.

The cutter 70, in the preferred method of production, is now discarded. It may be appreciated that in forming the openings 86, 88, 90, etc., it is important that the formations be identical with the others, in order to insure symmetry of the hinge arrangement. Thus, in order that the rotations of the portions relative to each other be sufficiently symmetrical about the spin axis and the pivot axes, it is desirable that the bridges 34 and 36 in flexure 28 be identical with and symmetrical to corresponding bridges 30 and 32 in the diametrically opposite flexure 26. If all of the holes or depressions, therefore, are formed by the same identical cutter 70, the depressions as well as the remaining bridges more likely will be identical on the same workpiece.

FIGS. 8, 8a and 9 illustrate the steps of separating the workpiece into the three coaxially aligned and spaced portions 12, 14 and 18. While this step is described next in the sequence, it may be understood that the order of performing this step in relation to the formation of the holes and of steps which follow may be interchanged in accordance with manufacturing techniques and skill. The workpiece 60, having the openings 86, 88, 90, etc., formed therein if desired, remains on the mandrel 62. The cutter 70 and cutter holder 74 are removed from the movable machine element 72. In their place is inserted a second cutter holder 94 holding an electro-discharge machine cutter 96, shown in cross-sectional detail in FIG. 8a.

EDM cutter 96 has the general appearance of three sides of a rectangle, having flared ends 100. The cutter 96 has a gap 98 between two halves thereof. The gap 98 is positioned over the workpiece to coincide with the cylinder encompassing the openings 86, 88, 90, etc.

The cutter 96 is then brought into engagement with the workpiece 60, and cuts gap 22 from the uppermost portion of the outside surface 61, through the cylindrical wall, through the opposite portion of the same cylindrical wall from the interior surface and on through the entire workpiece, as indicated by the broken lines in FIG. 8. In such a manner, portion 14 is completely separated from gimbal portion 12, except for the criss-crossed bridge connections 44, 46 of flexure 40, and bridge connections 48 and 50 of flexure 42.

The cutter is then repositioned 180 degrees from the position as shown in FIG. 8. The flanges 100 are aligned with the annular flange 68, so that upon descent they will pass in contact with the annular step 68'. The workpiece, prior to this second separating step, is rotated 90 degrees so that the gap 98 coincides with the second encompassing cylinder encompassing the openings 90 and 86. The EDM cutter 96 is then moved to cut gap 20 completely through the workpiece 60.

In such a step, the gimbal portion 12 is completely separated from the rotor engaging portion 18 except for the integral bridge connections 30 and 36 in flexure 28, and bridges 30 and 32 in flexure 26. The annular flange 68, along with a substantially rectangular T-shaped legs comprises one portion 18 of the flexure hinge arrangement. When the flange 68 is fixed to the rotor, it may be appreciated that there is a cylindrical gap between the workpiece flexure hinge assembly's outside surface 67 and the attached rotor, so that the rotor may exercise its degrees of freedom relative to the gimballed portion 14.

The EDM cutter 96 is then removed from the workpiece 60. If the aligning of the EDM cutter 96 is precise, the gaps 20 and 22 will have substantially equal volumes. Further, by precisely positioning the cutter 96 relative to the workpiece 60, the weight and distribution of workpiece material will be symmetrical about a plane encompassing the mutually orthogonal axes 38 and 52.

Figure 10:
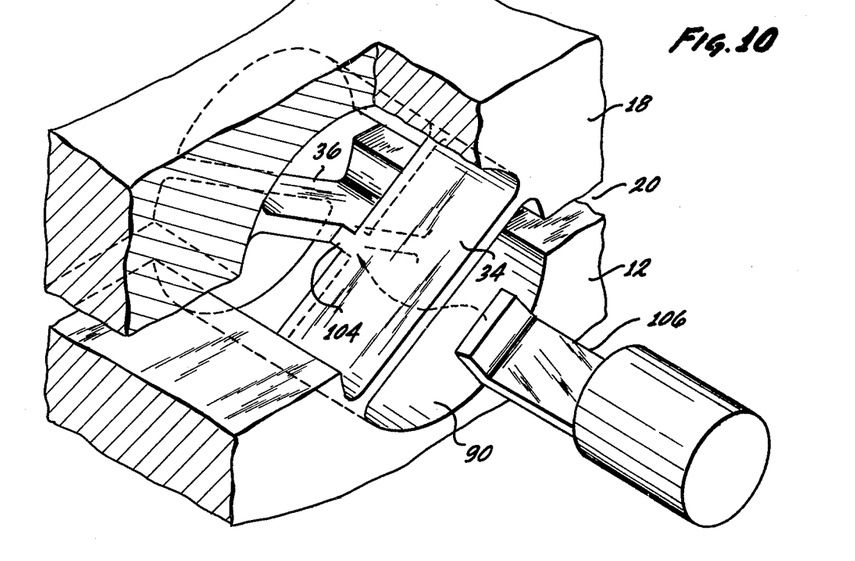
FIG. 10 is a partial perspective view, having substantial portions cut away for clarity, of suspension bridges of FIG. 1 at an intermediate stage of formation.
Figure 10A:
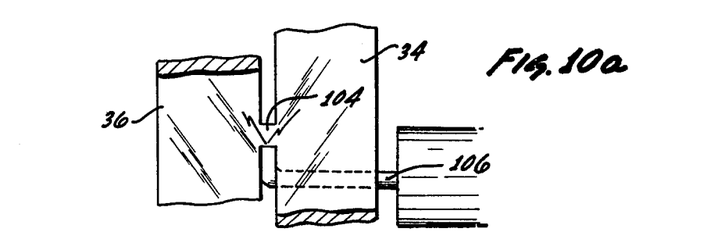
FIG. 10a is an elevation view illustrating one step in the methods of manufacturing of the present invention.
Figure 11:
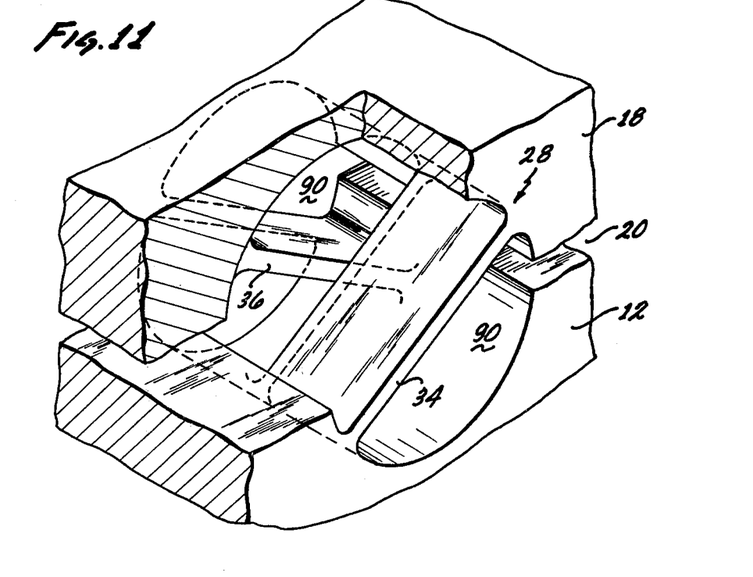
FIG. 11 is a partial perspective view, having portions thereof cut away for clarity, of the suspension bridges of FIG. 1, in completed form.

As indicated in FIGS. 10, 10a and 11, the process of forming the flexure hinge thus far described leaves a tether 104 connecting the two skew bridges in each opening. Opening 90 is shown representatively in FIG. 10 having the bridges 34 and 36 connecting portions 12 and 18 across gap 20. The tether 104 integrally connects bridge 34 with bridge 36. In order for the flexure 28 to pivot, however, it will be necessary for the adjacent bridges within each opening to cross-cross each other across the opening in an unconnected, skew relationship.

An L-shaped EDM cutter 106 can be inserted through the opening 90 and maneuvered into contact with the tether 104 as illustrated in FIG. 10a. The tether 104 then is removed to free bridge 34 from bridge 36. A similar process of tether removal can be used to remove the corresponding tethers remaining in the remaining openings 86, 88, 90, etc., to result in the cross bridge flexure 28 illustrated in the cutaway, enlarged detail perspective of FIG. 11.

It may be noted that the flexure hinge suspension system of FIGS. 1 and 2, if used in a gyroscope, will have the portion 14 connected to the spinning shaft, while the portion 18 is connected to the inertially sensitive element such as a rotor. If the portion 14 suffers an axial force, the bridges 30, 32, 34 and 36, providing a degree of freedom about axis 38, as well as the bridges 44, 46, 48 and 50 providing rotational freedom about axis 52 are all placed under a tensive stress relative to the portion 18.

It has been discovered that the thin metal strips comprising these bridges have far greater tensile strength than compressive strength. If the portion 14 is compressed toward portion 18, the failure of the thin metal strips under such a compression will occur at a pressure much less than a failure of the same thin metal strips under a tensive stress. That is to say, the thin metal strips of flexure pivot-type hinges have a far greater tensile strength than an ability to sustain compressive stresses.

It can be seen, therefore, that the unique methods employed herein produce a novel, monolithic flexure hinge gyro gimbal arrangement. There are many applications where extreme stresses will be placed on the flexure pivot connection strips or blades. It is not inconceivable that such stresses might approach hundreds of times the force of gravity in some applications, a force which the thin metal strips comprising a flexure pivot hinge will simply not take in compression without failure.

Figure 12:
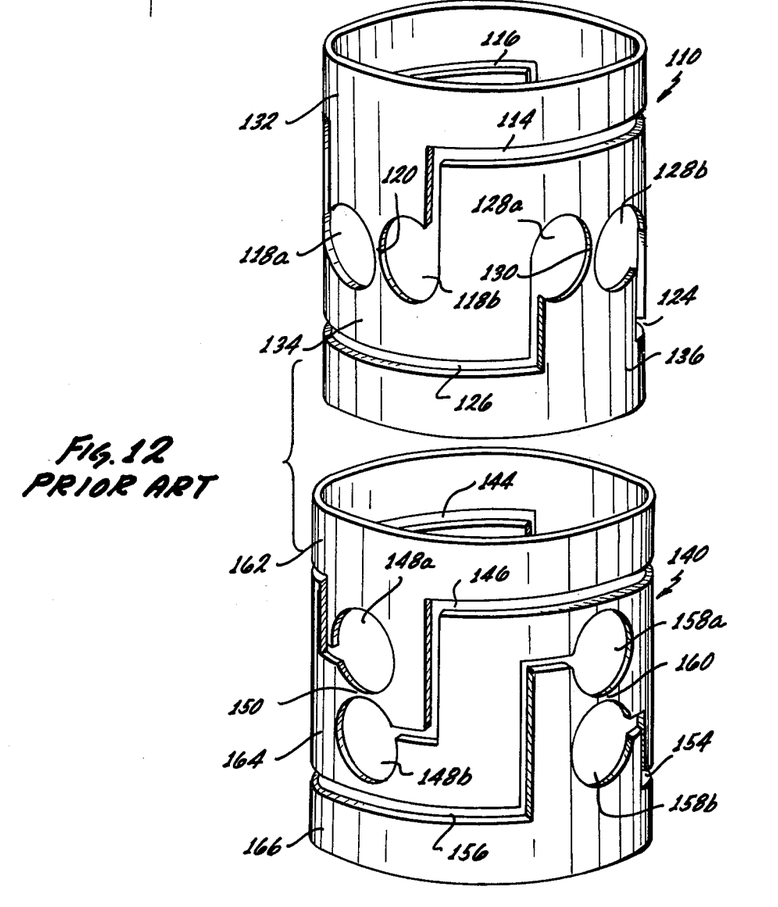
FIG. 12 is an expanded, exploded perspective view of a flexure hinge and its components known in the prior art.

The structure of the present flexure hinge suspension system invention is to be compared with the more common flexure hinges of the prior art, a representative example of which is illustrated in exploded form in FIG. 12 for convenient reference. In the prior art, a completely separate inner hinge unit 110 and outer hinge unit 140 are provided.

In the inner hinge unit 110, circumferentially extending slots 114, 116 are formed through the cylindrical unit. A bore having a diameter exceeding the width of the slots forms openings 118a and 118b as well as similar openings, not shown, on the opposite portion of the cylindrical side of the hinge unit 110. The bores 118a and 118b form what has been called a "necked-down" thin metal flexure portion 120 therebetween.

An additional pair of circumferential slots 124 and 126 are formed through the inner hinge member 110 axially spaced from the slots 114, 116. Like slots 114 and 116, slots 124 and 126 are generally U-shaped but inverted with respect to the slots 114, 116. At the end of these slots, bores 128a and 128b as well as corresponding bores generally on the opposite portion of the cylindrical wall of hinge 110 are formed to leave a thin, metal flexure strip 130 having a thickness comparable to the so-called "necked-down" flexure portion 120. The inner hinge unit 110 then comprises gimbal portions 132, 134 and 136 connected to each other only by the flexure strips 120, 130, etc.

In a similar manner, the outer hinge unit 140 is formed. A pair of slots 144 and 146 are circumferentially formed through the wall of unit 140 at an axial location precisely identical with the slots 114 and 116 formed in the inner unit 110. The somewhat U-shaped slots 144, 146 terminate in bores 148a and 148b which are oriented quite differently than the bores 118, 128 of the inner unit 110.

Additional slots 154 and 156 are circumferentially formed in a somewhat U-shape pattern to precisely coincide with corresponding slots 124 and 126 of the inner unit 110. The slots 154 and 156 also terminate in bores 158a and 158b having an orientation similar to, but 90 degrees rotatably spaced from the bores 148a and 148b. The bores 148a and 148b have corresponding, diametrically opposite bores, not shown in FIG. 12. Similarly, bores 158a and 158b have diametrically opposite bores not shown.

The bores 148a and 148b are formed to leave a thin metal, flexure strip 150 therebetween. Similarly, the bores 158a and 158b are formed in proximity to each other to result in a thin flexure strip 160. The slots and bores of the outer hinge unit 140 separate the outer hinge unit into gimbal portions 162, 164 and 166 connected to adjacent gimbal portions only by corresponding flexure strips 150 or 160.

The inner hinge unit is then telescopically inserted within the outer hinge unit so that the slot 114 coincides substantially with slot 146, slot 116 coincides substantially with slot 144, slot 124 coincides substantially with slot 154 and slot 126 coincides substantially with slot 156. Inner hinge unit gimbal portion 136 is fixed to outer gimbal hinge unit 166.

The gimbal portions 134 and 164 probably will be substantially independent of each other, and the flexure strip 120 will criss-cross flexure strip 150. Similarly, flexure strip 130 will criss-cross flexure strip 160. Other flexure strip criss-crossings occur on the opposite sides of the assembled inner and outer hinge units 110, 140.

It will be noted that each flexure has only a single blade that will accept the compressive (or tensive stress) and such stress is not shared by a pair of blades as in the present invention, thus providing approximately half as much strength as the suspension system of the present invention. Axial force in the opposite, downward direction as seen in the view of FIG. 12 will place simple bending or flexion load stresses on the flexure strips 150 and 160.

Such a structure inherently and severely limits the applications of such a gyro flexure hinge. Further, the ferocious precision with which the slots and bores must be made in separate, independent elements also may be appreciated. Moreover, in the prior art the use of cement or other bonding means to interconnect the many separable elements of the suspension system causes severe problems of both short and long term mechanical and thermal instability, especially because of lack of free thermal flow between parts. The presently described method of making a flexure hinge assembly, and the flexure hinge assembly produced thereby, obviates substantial portions of problems herein observed in the prior art.

Figure 13:
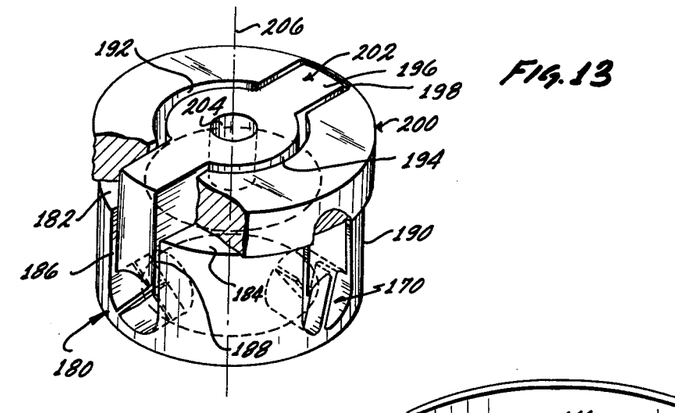
FIG. 13 is a perspective view, having portions cut away for clarity, of an alternative embodiment of the suspension system of FIG. 1.

The present method of forming a monolithic flexure hinge assembly may be utilized to form a flexure hinge suspension system connected to the spinning shaft and the inertially sensitive rotor at approximately the same axial position. FIG. 13, for example, shows such a formed, monolithic flexure hinge suspension system in an alternative embodiment. A workpiece, similar to workpiece 60, but not having a cylindrical bore formed completely along the longitudinal length therethrough, is placed on the mandrel 62. A cylindrical hole is removed from a portion of the axial length of the workpiece, to form substantially a cylindrical workpiece having one end closed.

Flexures substantially identical to flexures 26, 28, 40 and 42 are formed through the cylindrical portion of the workpiece to form flexures 170 and 180 at 90 degree intervals as shown. It is to be understood, of course, that diametrically opposite flexures are formed on that portion of the cylindrical flexure hinge suspension system of FIG. 13 not shown.

Separation cuts 182 and 184 can then be made to separate the closed end of the workpiece from the cylindrical portion. In a separate step, or simultaneously with the step of forming the separation cuts 182 and 184, cuts 186 and 188 can be formed. The gimbal portion 190 is then completely separated from the remaining portion of the workpiece, except by the integral bridges of the flexures 170, 180, etc.

A second separation cut can then be made concentrically with the axis to form cuts 192 and 194 on opposite sides of a diametrical cross piece 196. Additionally, separation cuts 198 and a corresponding cut in the cutaway portion diametrically opposite thereof can be axially made to completely separate gimbal portions 200 and 202.

An axial opening 204 can be formed to allow attachment to the gyroscope spinning shaft. Similar to the preferred embodiment, a flange on the workpiece can result in a gimbal portion 200 having a radius greater than the radius of gimbal portion 190, for attachment to a concentrically positioned rotor.

It can be seen that the embodiment of FIG. 13 provides for attachment of the rotor and the shaft to the intermediate gimbal at a substantially coincidental position along the spin axis. Axial forces on the shaft will therefore be communicated to the rotor through the flexures 170, 180 wherein the integral, skew bridges will sustain simultaneously compressive and tensive stresses. Perfect symmetry about the spin and pivot axes, however, can be achieved in the monolithic structure as described.

Figure 14:
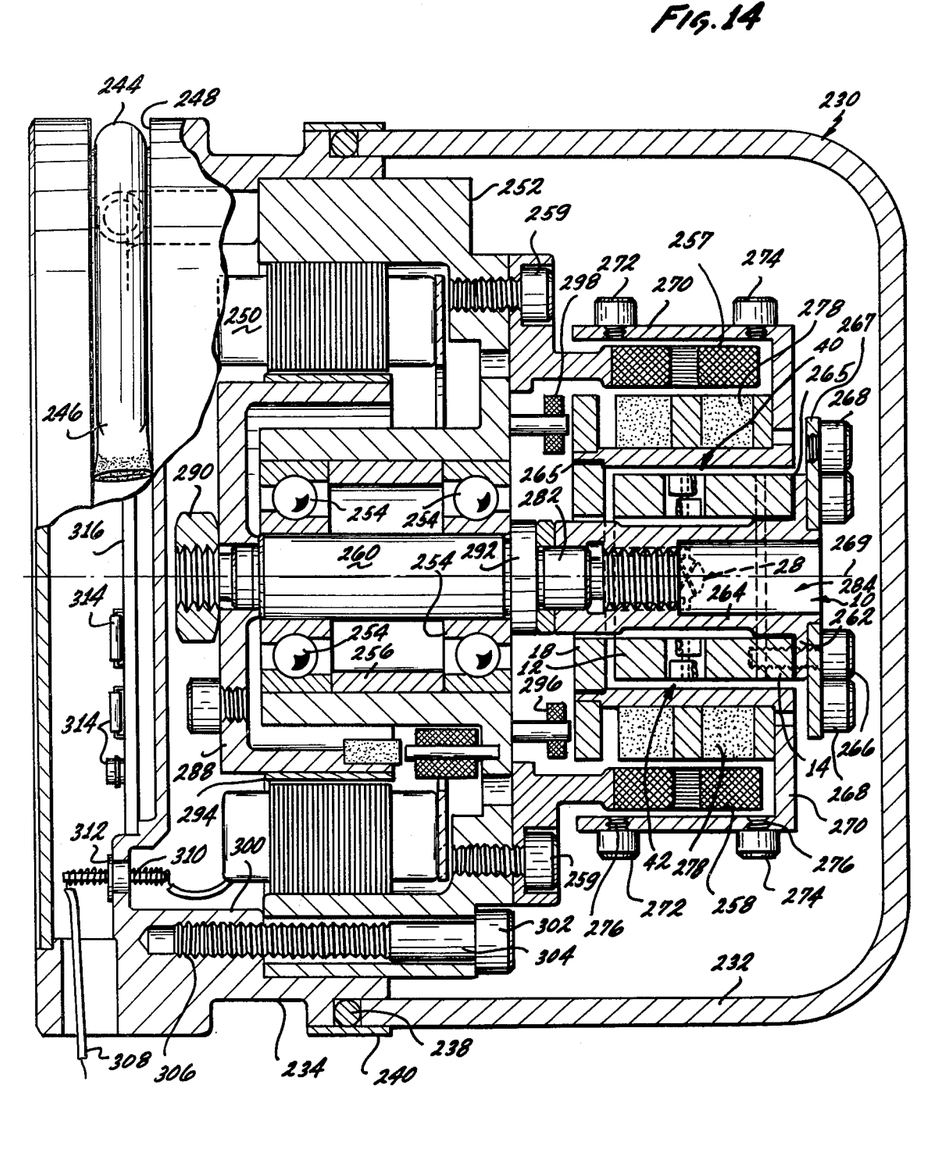
FIG. 14 is a cross-sectional elevation view of an alternative embodiment of the present invention in a gyroscope assembly.

In FIG. 14, we turn to yet another alternative embodiment of the invention comprising a gyroscope assembly 230. The gyroscope 230 comprises a housing having a cover 232 and a base 234.

The lip of the cover 232 is fitted over a groove 236 of the base 234, and on top of an annular seal ring 238. The seal ring 238 may be welded to create a vacuum-tight seal. Alternatively, a strip of metal 240 may be welded or otherwise secured to cover the seal ring 238 and the joinder of the cover 232 in the groove 236.

A flexible tube 244 pneumatically communicates with the interior of the single compartment of the gyroscope assembly 230 and its housing. Air can be evacuated through the tube 244, and a substitute medium may be inserted into the interior compartment. Typically, a one-half atmosphere of hydrogen is inserted into the interior. The pressure within the single interior compartment is thus reduced, reducing the windage affects of the rotating rotor. Thermal gradients caused by differential thermal expansion characteristics of the various materials can be controlled better. The tube 244 can be pinch-sealed at its tip 246, which can be then tucked into a short groove formed along a portion of the circumference of the base 234.

Prior to the sealing of the cover 232 to the base 234, the gyroscope is assembled. Particularly, an annular hysteresis motor 250 is mounted to a mounting plate 252. The mounting plate forms a central recessed cylinder to receive shaft bearings 254 appropriately spaced by annular spacer 256.

Annularly disposed torquers 257 and 258 are mounted to the mounting plate 252 by threaded fasteners 259.

Figure 15:
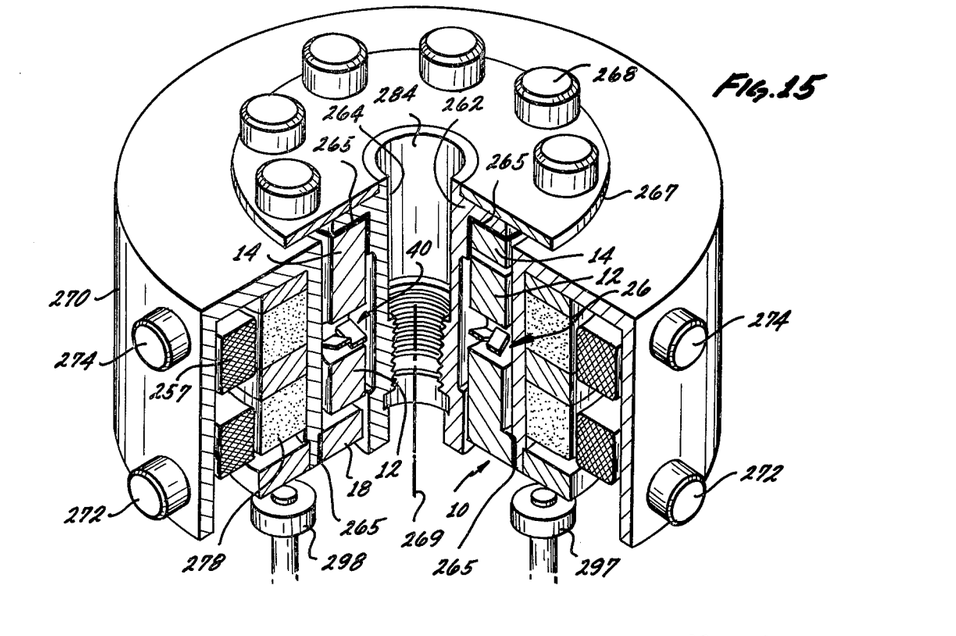
FIG. 15 is a partial perspective, partially cut away view of the alternative embodiment of FIG. 14.

FIGS. 14 and 15 illustrate the assembly of a portion of the gyroscope unit. An annular rotor 270, having a somewhat inverted U-shape in cross section, is assembled to the shaft 260 through the flexure hinge arrangement as described above with regard to FIGS. 1 and 2. Shaft connecting portion 14 can be bonded or cemented beneath upper flange 262 of the upper shaft portion 264 by bond 265. Either cumulatively or alternatively, the upper flange 262 can be secured to the shaft engaging portion 14 by a threaded fastener 266. A balancing wheel 267 can be assembled onto the upper flange 262. The balancing wheel 267 may be supplied with balancing lugs 268 for balancing the spin of the shaft about the spin axis 269.

The rotor engaging portion 18 can be bonded as by epoxy bond 265 to the rotor 270. Rotor 270 can be formed to cooperate with balancing lugs 272, 274. The balancing lugs 272, 274 have external threads on a shank adapted to be received by internal threads 276. Internal threads 276 are formed wholly within the rotor 270 itself, thus minimizing any unbalancing effects sometimes caused by special nut arrangements for balancing lugs.

Permanent magnets 278 are mounted on the interior of the rotor U-shape design so that when the rotor 270 is aligned with the spin axis 269, the permanent magnets 278 are arranged in a concentric path with, and in flux influencing proximity to the torquers 257 and 258. The permanent magnets 278 and the torquers 257, 258 are shielded from the effects of the hysteresis motor 250 by the mounting plate 252 in the ultimate assembly.

It can be seen at this point that the rotor 270 is gimballed to shaft upper portion 264 by the flexure hinge arrangement 10 through the gimbal portion 12. The flexure bridges of flexures 40 and 42, and flexure 28 in phantom can be seen in FIG. 14, while the flexures 26 and 40 can be seen in FIG. 15.

The thus assembled upper shaft portion 264 can be connected to lower shaft portion 260 through threaded fastener 282 through the axial opening 284 in the upper shaft portion 264.

A drive flange 288 on one side of the mounting plate 252, can be joined with the shaft 260 by nut 290. By tightening nut 290, the shaft 260 can be preloaded into the bearing assembly by virtue of upper flange 292. The driving flange 288 has an annular wheel concentric with the driving means such as motor 250, the wheel having permanent magnet 294 attached to inductively receive power from the motor 250.

Inductive sensors 296 and 298 are positioned on the mounting plate 252 to receive differential, inductively generated signals from the rotor 270, to produce a signal corresponding to displacement of the shaft 260 relative to the rotor 270.

The thus assembled gyroscope can be fit into an annular seat 300 in the interior of base 234. Threaded fasteners 302 can be used to secure the mounting plate, and thus the single unit assembled gyroscope to the base 234. The cover 232 can then be mounted on the groove 236 and a vacuum-tight seal arranged as explained above.

As can be seen by the foregoing description, a gyroscope can be completely assembled independent of a housing in which later it might be deployed. The gyroscope, as a single unit, can be very easily and efficiently mounted in a single interior compartment of a housing which can be made vacuum-tight by securing a single seal. The housing can be substantially evacuated and a controlled medium for controlling the atmosphere within the housing supplied.

The unitary housing compartment shown in FIG. 14 illustrates an alternative method of gyro construction which provides for greater accuracy of shaft and bearings. The motor 250, bearings 254, shaft 260 and drive plate 288 can be mounted to the mounting plate 252 and, as a unit, positioned on seat 300 and secured by threaded fastener 302. The shaft 260 then can be rotated at operational speeds to pre-test the shaft stability and bearing balance precision prior to the seating of the rotor assembly constructed on shaft upper portion 264. Indeed, the shaft and bearing balance can be pre-tested in the actual housing base 234 prior to rotor assembly mating. For further manufacturing and assembly convenience, the shaft 260, bearings 254, drive plate 288 and race 256 may be pre-assembled on the mounting plate 252 to form a bearing cartridge. The cartridge, if desired, may include also the motor 250.

Power can be supplied to the drive means 250 from leads 308. The leads 308 supply power through electrical connector 310 penetrating through the base 234 in sealed cap 312. Signals from pickups 296, 298 can be similarly conveyed through the vacuum-tight interior compartment to electrical circuitry 314 mounted on a circuit board 316, which may be of the conventional printed circuit board or printed wire board types well known in the art.

Figure 16:
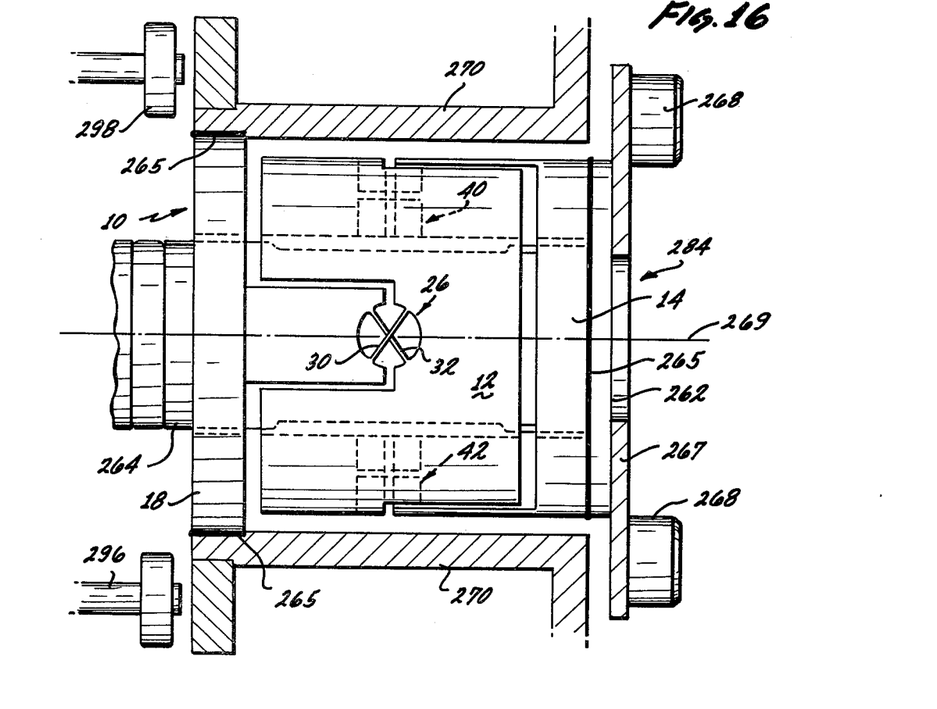
FIG. 16 is a partial cross-section of yet another alternative embodiment of the invention as seen in FIG. 14, showing the assembly of the suspension system in close detail.

FIGS. 15 and 16 illustrates alternative embodiments of uses of the discoveries encompassed by the present invention. It may be noted that one advantageous embodiment of the monolithic flexure hinge arrangement is that the hinge portion 14 connected to the shaft 264 is axially spaced a distance relative to the spin axis 269, from the hinge portion 18 connected to the rotor 270. As may be seen in FIG. 15, if the shaft 264 is positioned vertically having portion 14 higher than portion 18, the bridges in each and every flexure are in tension. The rotor 270 "hangs" through the gimbal portion 12 from the rotatably mounted shaft 264.

Of course, if the rotor, shaft and gimbal assembly of FIG. 15 were inverted along a vertical spin axis 269, each and every bridge in the flexure hinge system would suffer compressive stress. It has been found, however, that thin blades used for flexure hinges buckle and fail far more readily, by a factor of five or more, under compressive stress loads than under tensile stresses. It is now desired to have a tensile strength in the flexure bridges equal to many times gravity without failure. The present embodiment is believed to provide such capability, when the assembly is aligned vertically to establish tensive stress loading in the flexure bridges. It will be appreciated that in the present structure, in each flexure hinge G-loads are shared by both bridges of the flexure hinge.

In FIG. 16, the spin axis is aligned orthogonally to the vertical so that the spin axis is substantially orthogonal to the field forces of gravity. The rotor 270 is connected by gimbal 12 to the horizontal shaft 264. The stresses in the bridge 30 will be different from the stresses in bridge 32.

In many applications, the embodiment of FIG. 16 is desired. It is believed that the tension stress of one such paired bridge cancels any imbalance effect caused by the compressive stress of the other bridge in the pair. In any event, a slight but crucial structural change is made in the resonant spin frequency of the embodiment of FIG. 16, from that of the embodiment of FIG. 15.

In field activities, especially where large inventories of replacement gyros are maintained it is desirable to have complete interchangeability and uniformity for replacement and routine servicing. This uniformity, however, can result in serious, practical problems in gyro operation in certain applications.

Figure 17:
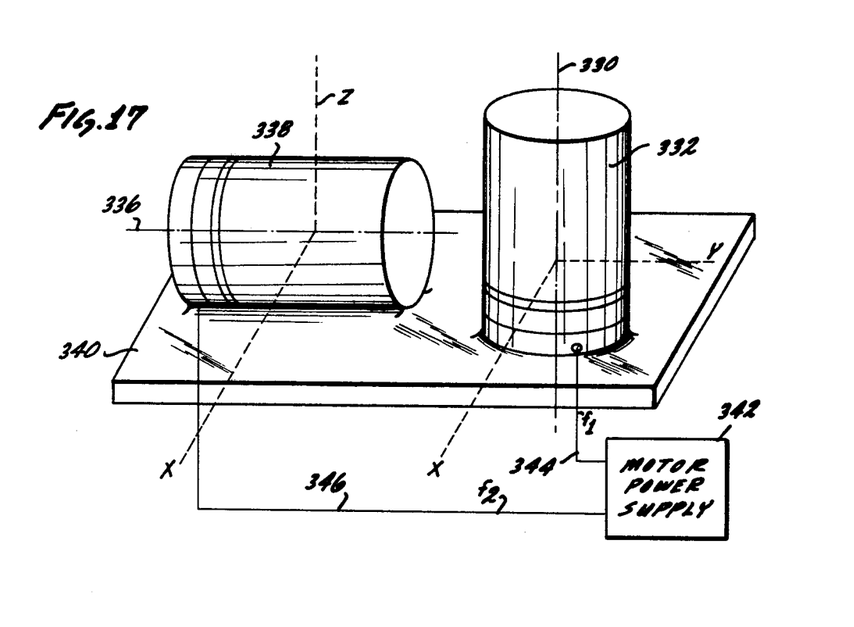
FIG. 17 is a perspective schematic view of an application of the embodiments of FIGS. 15 and 16.

For example, in two gyro systems, such as the strapped-down platform system shown in FIG. 17, the spin axis 330 on one gyro 332 is oriented orthogonally to the spin axis 336 in the second gyro 338. If the axis 330 is considered oriented in the z direction, and the axis 336 is considered to be oriented in the y direction the x axis in the Cartesian coordinate system will be seen to lie in a plane parallel to the base 340. The gyroscope 332 will then sense movements about its x axis and the y axis. The second gyroscope 338 will sense movements about its x axis and its z axis. Movement about all 3 of the Cartesian coordinate axes will be sensed by either one or the other of the two gyros 332, 338 with a redundant reading about the x axes by both gyros. Power is supplied from motor power supply 342 through leads 344, 346 to, respectively, gyroscopes 332 and 338.

It is well known that if two dynamically tuned gyros are mounted on the same base 340 and are operated at the same spin speeds, the slight vibrations set up by one gyro 332 degrades the performance of the other gyro 338. This effect is referred to as "cross-talk" and is described in greater detail in Craig "Theory of Errors of a Multi-gimbal, Elastically Supported, Tuned Gyroscope", *I. E. E. E. Transactions on Aerospace and Electronic Systems*, Vol. AES-8, No. 3, May 1972 and "Dynamically Tuned Gyros in Strapdown Systems", Conference Proceedings No. 116, AGARD, NATO. In order to eliminate this degradation of accuracy, it is a common practice to operate the two gyros at different speeds. Thus, a frequency $f_1$ is delivered to gyroscope 332, while a different frequency $f_2$ is transmitted to the motor of gyroscope 338.

Such practice, however, inherently leaves problems unresolved. Where two gyros have the same tune independent of their orientation with respect to gravity, one such practice known is to drive the gyros with two different frequencies, each of which is slightly off the tuned frequency. Both instruments are thereby detuned, in effect. The operation at different spin speeds thus produces detuning errors. If the gyros are tuned to different speeds, on the other hand, the normal requirement for interchangeability is not satisfied.

The present invention, as embodied by the use simultaneously of the embodiments of FIGS. 15 and 16 in the gyro system, eliminates the necessity for such de-tuning. Identical gyros can be used, and the inherent tuned spin frequency shift caused by the differential loading of the differently oriented flexure bridges will result in sufficiently different spin frequency to prevent gyro coupling or interference.

That is to say, if $f_1 = f_2$ in FIG. 17, the stress in all of the bridges being tensive or being compressive establishes as in the embodiment of FIG. 15, a peculiar tuned frequency resonance. This tuned frequency resonance will be distinct from and observably different from a tuned frequency resonance established by the identical structure having its spin axis oriented in a substantially horizontal plane as illustrated in FIG. 16. The different tuned frequency resonance is caused by the fact that the bridges in each pair constituting a flexure will have opposed or opposite types of stress.

Figure 18:
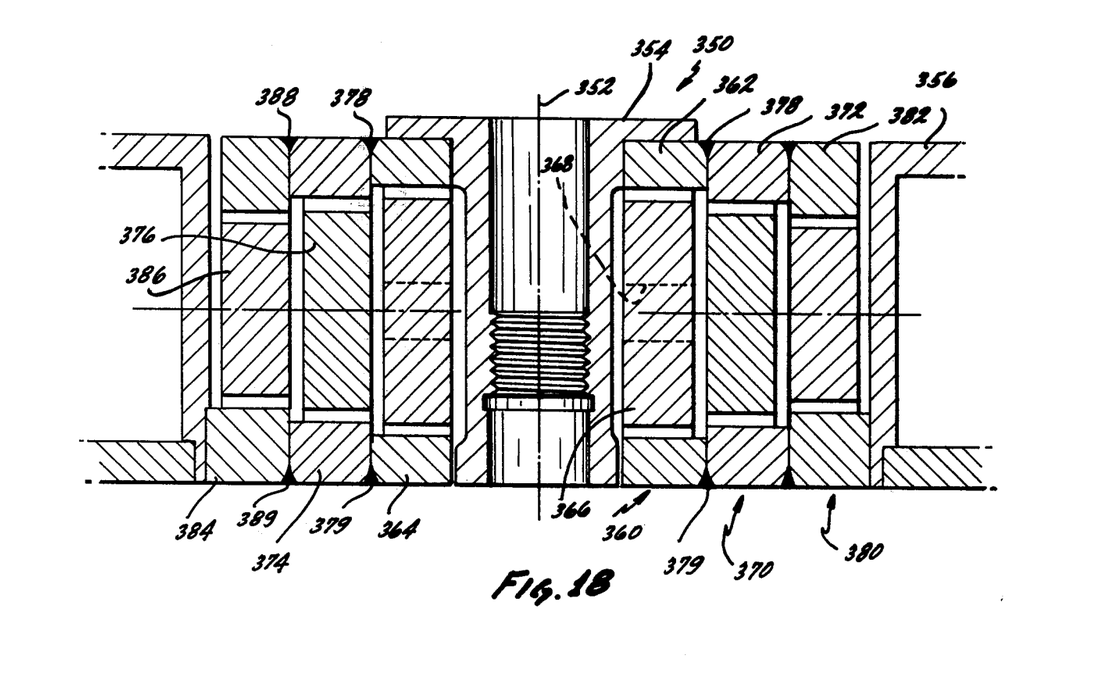
FIG. 18 is an elevation view in cross-section, of an alternative embodiment employing a three gimbal in shunt, rotor-to-shaft gimbal.

FIG. 18 shows yet another alternative embodiment to which the present invention is well suited. In FIG. 18, a three gimbal configuration 350 is shown in cross-sectional elevation. The upper shaft portion or hub 354 spins about the spin axis 352. The inertially sensitive element is the rotor 356. Unlike the suspension system of FIGS. 1 and 2, the three gimbal configuration 350 of FIG. 18 contains three interrelated monolithic gimbal suspension systems 360, 370 and 380.

Gimbal suspension system 360 has a structure, and is made in a manner, similar to the gimbal suspension system 10. Suspension system 360 has a shaft attaching portion 362, a rotor attaching portion 364, and a gimbal portion 366. The rotor attaching portion 364 has two degrees of freedom relative to the shaft attaching portion 362 by virtue of the monolithic flexures 368, shown schematically in FIG. 18.

The second monolithic suspension system 370 is constructed similarly to suspension system 360, but having a greater diameter so that it can fit concentrically about suspension system 360. Suspension system 370 is comprised of a shaft attaching portion 372, a gimbal portion 376, and rotor attaching portion 374. Shaft attaching portion 372 is fixed to suspension system shaft attaching portion 362 by a bonding, such as weld 378. Similarly, rotor attaching portion 374 is fixed to rotor attaching portion 364 of monolithic suspension system 360 by a bonding such as weld 379.

In like manner, monolithic suspension system 380 is constructed similarly to the hinge suspension 10, having a greater diameter than monolithic suspension system 370. Suspension system 380 fits concentrically about suspension system 370, having a shaft attaching portion 382, a rotor attaching portion 384, and a gimbal portion 386. Rotor attaching portion 384 has two degrees of freedom about orthogonal pivot axes relative to shaft attaching portion 382, even as rotor attaching portion 374 of suspension system 370 has two degrees of freedom relative to its shaft attaching portion 372, by virtue of mutually orthogonal pivot axes in the gimbal portion 376. Shaft engaging portion 372 is fixed to shaft engaging portion 382 by a bonding such as weld 388. Similarly, rotor engaging portion 374 is fixed to rotor engaging portion 384.

The mutually orthogonal axes of suspension system 370 are rotatably or angularly spaced from the mutually orthogonal axes of suspension system 360 by 60 degrees. Further, the mutually orthogonal axes of suspension system 380 are rotatably spaced from the mutually orthogonal axes of suspension system 360 by 120 degrees. The shaft attaching portions 362, 372 and 382 are fixed to the shaft upper portion or hub 354. Since the rotor attaching portions 364, 374 and 384 are fixed to the rotor 356, it can be seen that only the gimbal portions 366, 376 and 386 are free relative to each other. The rotor 356 will have the desired two degrees freedom about the hub 354, even as in the flexure hinge suspension system 10 of FIGS. 1 and 2, but will have such two degrees of freedom about three separate sets of mutually orthogonal axes, each set of mutually orthogonal axes rotatably displaced 60° from the other of the two mutually orthogonal axes. The principal moments of inertia of the three gimbal configuration 350 can be selected to completely cancel errors of twice spin frequency rectification effects by merely adjusting the inertias of the gimbals 366, 376 and 386. The concept of a dynamically tuned, three rotor gyro having three concentric gimbals is described in greater detail in U.S. Pat. No. 3,832,906 to the inventor of the present invention.

Some advantage in a multi-gimbal arrangement can be achieved by having two concentrically positioned, attached gimbal suspension systems, such as suspension systems 360 and 370 in FIG. 18. The suspension system 380 is eliminated, so that the rotor 356 can be connected directly to the rotor connecting portion 374 of suspension system 370. In such a two gimbal arrangement, the degree of freedom pivot axes of the individual gimbals are rotatably displaced from each other by 90°. For further detailed description, of the advantages and operation of such a multigimbal configuration, attention is directed to FIG. 1 of the aforementioned U.S. Pat. No. 3,832,906.

The foregoing detailed description is illustrative of several embodiments of the invention. It is to be understood, however, that additional embodiments will be perceived by those skilled in the art. The embodiments described herein together with those additional embodiments are considered to be within the scope of the present invention.

What is claimed is:

1. A method for making a monolithic flexure hinge suspension system for a tuned inertial instrument, comprising the steps of:
    (a) mounting on a mandrel, an axially extended workpiece having an axis and an axial hole extending at least partly therethrough, defining a bounding wall having an interior surface and an outside surface;
    (b) forming in said outside surface at each of two diametrically opposite locations of said workpiece an original, two complemental, adjacent depressions separated from each other by a first thin remaining raised bridge having a longitudinal dimension which is skew in relation to the axis of the workpiece;
    (c) forming in said interior surface at each of said two diametrically opposite locations, a secondary two complemental adjacent depressions separated from each other by a second thin remaining raised bridge having a longitudinal dimension which is skew relative to, and crosses the like dimension of said first raised bridge, and which is skew in relation to the axis of the workpiece;
    (d) extending at each of said locations a predetermined one of the primary and secondary depressions to meet the corresponding other depressions to form, at each location, an orifice through the tubular wall bridged across by the corresponding first and second raised crossed bridges;
    (e) removing in each said orifice the remaining material of the workpiece interconnecting said first raised bridge and its proximate second raised bridge to make the crossed raised bridges in each orifice separate from each other; and
    (f) cutting said workpiece between said diametrically opposed orifices to form two substantially co-axial, cylindrical tubes, monolithically and integrally connected only by said separated, skew, raised crossed bridges.

2. The method of claim 1 wherein said forming steps (b) and (c), form said thin remaining raised bridges with a substantially uniform cross-section substantially throughout their length.

3. The method of claim 1 further comprising the step of forming, prior to said mounting step, said axial, substantially cylindrical hole through said workpiece.

4. The method of claim 1 wherein said cutting step is performed by an electrodischarge machining cutting tool.

5. The method of claim 1 further comprising the step of rotating the workpiece with said mandrel 180 degrees between each forming of said complemental depressions.

6. The method of claim 1 wherein said forming from said outside surface and said forming from said interior surface are accomplished by moving the workpiece relative to a cutting tool to bring the workpiece and the cutting tool into engagement.

7. The method of claim 5 wherein the cutting tool comprises an electro-discharge machining tool.

8. The method of claim 1 further comprising the steps of:
    forming from said outside surface at diametrically opposite locations two additional primary complemental adjacent depressions, separated from each other by a thin remaining raised bridge;
    forming from said interior surface of said workpiece at diametrically opposite locations two additional secondary depressions, separated from each other by a second thin remaining raised bridge, said second thin raised bridge being skew relative to, and crossing said first raised bridge to form a second set of orifices through said workpiece;
    and further comprising the step of removing in each of said second set of orifices any part of the workpiece interconnecting said first raised bridge and its proximate second raised bridge to make the crossed raised bridges in each orifice separate from each other.

9. The method of claim 8 further comprising a second cutting step cutting said workpiece between said second set of diametrically opposed orifices to form three, monolithically connected portions, two of said portions being radially adjacent each other relative to said substantially cylindrical workpiece, said two portions being connected to the third portion by said separated, skew raised bridges.

10. The method of claim 8 further comprising a second cutting step cutting said workpiece between said second set of diametrically opposed openings to form three substantially co-axial, axially spaced cylindrical tubes monolithically connected only by said separated, skew raised bridges.

11. The method of claim 10 wherein said forming steps and said cutting steps are performed by a cutting tool.

12. The method of claim 11 wherein said cutting tool comprises an electro-discharge machining tool.

* * * * *